(12) United States Patent
Tanahashi et al.

(10) Patent No.: US 7,153,596 B2
(45) Date of Patent: Dec. 26, 2006

(54) PERPENDICULAR MAGNETIC RECORDING MEDIUM, MANUFACTURING PROCESS OF THE SAME, AND MAGNETIC STORAGE APPARATUS USING THE SAME

(75) Inventors: Kiwamu Tanahashi, Kokubunji (JP); Reiko Arai, Odawara (JP); Atsushi Kikugawa, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/697,002

(22) Filed: Oct. 31, 2003

(65) Prior Publication Data

US 2004/0234818 A1    Nov. 25, 2004

(30) Foreign Application Priority Data

May 20, 2003   (JP) .............................. 2003-141296

(51) Int. Cl.
  *G11B 5/66* (2006.01)
  *G11B 5/70* (2006.01)
(52) U.S. Cl. ..................................... 428/829
(58) Field of Classification Search ........ 428/694 TM, 428/216, 694 TS, 900, 829, 828, 828.1
See application file for complete search history.

(56) References Cited

U.S. PATENT DOCUMENTS 6,645,614 B1 * 11/2003 Girt et al. ................... 428/336
6,818,330 B1 * 11/2004 Shukh et al. ........ 428/694 TM
2003/0022023 A1 * 1/2003 Carey et al. ........ 428/694 MM

FOREIGN PATENT DOCUMENTS

| JP | 6-103553 | 4/1994 |
|---|---|---|
| JP | 7-129946 | 5/1995 |
| JP | 11-191217 | 7/1999 |
| JP | 2001-155321 | 6/2001 |
| JP | 2001-155322 | 6/2001 |
| JP | 2002-342909 | 11/2002 |

* cited by examiner

*Primary Examiner*—Holly Rickman
(74) *Attorney, Agent, or Firm*—Mattingly, Stanger, Malur & Brundidge, P.C.

(57) ABSTRACT

A soft magnetic underlayer includes a first amorphous soft magnetic layer to which an exchange bias magnetic field is applied directly from an antiferromagnetic layer or via a ferromagnetic layer, and a second amorphous soft magnetic layer which is formed on the first amorphous soft magnetic layer via a non-magnetic layer. The first amorphous soft magnetic layer and the second amorphous soft magnetic layer are antiferromagnetically coupled.

10 Claims, 16 Drawing Sheets

MEDIUM A

MEDIUM I

MAGNETIZATION

MEDIUM P

EMBODIMENT

COMPARISON

PERPENDICULAR MAGNETIC RECORDING MEDIUM, MANUFACTURING PROCESS OF THE SAME, AND MAGNETIC STORAGE APPARATUS USING THE SAME

BACKGROUND OF THE INVENTION

1. Field of the Invention

The present invention relates to a magnetic recording medium and a magnetic storage apparatus, more particularly, to a magnetic recording medium having an a real recording density of 7.75 Gbit per square centimeter and a magnetic storage apparatus including the magnetic recording medium.

2. Discussion of the Background

Since 1998, the a real recording density of a hard disk drive is increased at an annual rate of 100 percent. However, the increase of a real recording density clearly causes the thermal decay that magnetically recorded data is erased under the influence of circumferential heat. In the conventional a real recording system, it is considered difficult to reach the a real recording density of over 7.75 Gbit per square centimeter.

Unlike the longitudinal recording system, the perpendicular recording system has the characteristic that the demagnetization field acting between adjacent bits is reduced as the linear recording density is increased, and the recorded magnetization maintains stable. Further, since a soft magnetic underlayer having a high permeability is arranged under a perpendicular recording layer, the strong recording magnetic field is obtained, thereby enabling the use of the perpendicular recording layer with high coercivity. Therefore, the perpendicular recording system is considered to be one of effective means which overcomes the thermal fluctuation limit of the longitudinal recording system.

In the perpendicular recording system, effectively, the high-density recording is realized by combining a single-pole-type head and a double-layer perpendicular recording medium comprising the soft magnetic underlayer and the perpendicular recording layer. However, since the double-layer perpendicular recording medium has the soft magnetic underlayer with a high saturation magnetic flux density (Bs), the leakage magnetic flux caused from a domain wall in the soft magnetic underlayer is observed as a spike noise. The motion of the domain wall in the soft magnetic underlayer cause the decay of the recorded magnetization and, further, the stray field in the apparatus concentrates to the recording head, thereby causing the decay of the recorded magnetization just under the recording head.

Japanese Laid-open Patent Application Publication No. 7-129946 (Patent Document 1) and Japanese Laid-open Patent Application Publication No. 11-191217 (Patent Document 2) disclose a method by which a hard magnetic pinning layer is provided between the soft magnetic underlayer and the substrate and the magnetization of the soft magnetic underlayer has one orientation. Further, Japanese Laid-open Patent Application Publication No. 6-103553 (Patent Document 3) discloses a method for suppressing the domain wall motion in the soft magnetic underlayer by the exchange coupling to the antiferromagnetism by aligning magnetic spins in a single direction.

According to the method for arranging the hard magnetic pinning layer, a magnetic domain is easily formed at the inner and outer edges of a disk, and the spike noise might be observed from the formed portion of the magnetic domain. On the other hand, according to the method for suppressing the domain wall motion in the soft magnetic underlayer by the antiferromagnetic layer, advantageously, the decay of recorded magnetization by the domain wall motion is suppressed and, however, the spike noise due to the domain wall is not suppressed.

Further, Japanese Laid-open Patent Application Publication No. 2001-155322 (Patent document 4) proposes a method for inverting the magnetization of the soft magnetic layer forming the soft magnetic underlayer containing two or more soft magnetic layers which are separated by the non-magnetic layer. However, when the substrate is disc-shaped, the layers easily have a multi-domain structure. The fluctuation of the recording and reproducing efficiency due to the domain wall is caused and the modulation in output signal is thus observed.

SUMMARY OF THE INVENTION

The present invention is devised in consideration of the above-mentioned problems. Specifically, it is an object of the present invention to provide a perpendicular magnetic recording medium with a high medium S/N ratio and with a recording density of 7.75 or more Gbit per square centimeter, in which the quality of output signal is improved by controlling a magnetic domain in a soft magnetic underlayer and decay of recorded magnetization due to astray field is suppressed, and to easily realize a magnetic storage apparatus with a high recording density and with high reliability.

To accomplish the above object, according to the present invention, there are provided a perpendicular magnetic recording medium and a magnetic storage apparatus having a perpendicular recording layer on a substrate via a soft magnetic underlayer, wherein the soft magnetic underlayer comprises: a first amorphous soft magnetic layer; a second amorphous soft magnetic layer; a non-magnetic layer which is formed between the first amorphous soft magnetic layer and the second amorphous soft magnetic layer; and an antiferromagnetic layer which applies an exchange bias field to the first amorphous soft magnetic layer, and the first amorphous soft magnetic layer and the second amorphous soft magnetic layer are antiferromagnetically coupled.

With the perpendicular magnetic recording medium and the magnetic storage apparatus having the above structure, the spike noise and the modulation in output signal are suppressed and the decay of recorded magnetization due to the stray field is suppressed.

A perpendicular magnetic recording medium according the present invention has a perpendicular recording layer on a substrate via a soft magnetic underlayer, wherein the soft magnetic underlayer comprises: a first amorphous soft magnetic layer; a second amorphous soft magnetic layer; a non-magnetic layer which is formed between the first amorphous soft magnetic layer and the second amorphous soft magnetic layer; and an antiferromagnetic layer which applies an exchange bias field to the first amorphous soft magnetic layer, and the first amorphous soft magnetic layer and the second amorphous soft magnetic layer are antiferromagnetically coupled.

The soft magnetic underlayer includes a first amorphous soft magnetic layer to which the exchange bias field is applied directly from an antiferromagnetic layer or via a ferromagnetic layer, and a second amorphous soft magnetic layer which is formed on the first amorphous soft magnetic layer via a non-magnetic layer. The first amorphous soft magnetic layer and the second amorphous soft magnetic layer are antiferromagnetically coupled.

Consequently, the magnetic domain in the first amorphous soft magnetic layer and the second amorphous soft magnetic layer has a quasi-single domain, and the spike noise and the modulation in output signal are suppressed. Preferably, the thickness of the first amorphous soft magnetic layer is equal to that of the second amorphous soft magnetic layer, there by causing the feed-back of the magnetic flux between the first amorphous soft magnetic layer and the second amorphous soft magnetic layer, and a state of the quasi-single domain in the first amorphous soft magnetic layer and the second amorphous soft magnetic layer becomes stable.

Preferably, a material with the antiferromagnetism at the film formation is used as the antiferromagnetic layer. Specifically, the antiferromagnetic layer has a disordered alloy mainly composed of Fe and Mn or a disordered alloy mainly composed of Ir and Mn. An ordered alloy such as PtMn or NiMn is in a disordered state at the film formation and does not have the antiferromagnetism. The ordered alloy needs the ordering heat treatment in a magnetic field for some hours. Unpreferably, the treatment causes the medium manufacturing processing to be complicated and the manufacturing costs are increased.

A metal layer with a face-centered cubic (fcc) structure is formed below the antiferromagnetic layer so as to control the crystallographic orientation and the gain size of the antiferromagnetic layer. Specifically, the fcc-metal layer contains Pd, Pt, Cu, or NiFe. The fcc-metal layer is directly formed onto the substrate and, preferably, the adhesion of film is improved by forming an amorphous pre-coating layer between the substrate and the fcc-metal layer.

The first amorphous soft magnetic layer may directly be formed on the antiferromagnetic layer. However, the exchange bias field can largely be applied to the first amorphous soft magnetic layer by forming the first amorphous soft magnetic layer via a ferromagnetic layer with high magnetic moment.

Preferably, a material of the ferromagnetic layer contains, e.g., a bcc alloy mainly composed of Co and Fe, and the thickness is not less than 1 nm and is not more than 10 nm.

For the first amorphous soft magnetic layer and the second amorphous soft magnetic layer, Bs is one tesla or more and the coercive force measured in the head running direction is 80 A/m or less. Further, as long as the surface flatness is excellent, the material is not limited. Specifically, the first amorphous soft magnetic layer and the second amorphous soft magnetic layer are mainly composed of Co or Fe, and Ta, Hf, Nb, Zr, Si, B, and C are added to Co or Fe to form the amorphous alloy. Thus, the above property is obtained.

The non-magnetic layer formed between the first amorphous soft magnetic layer and the second amorphous soft magnetic layer acts to antiferromagnetically couple the first amorphous soft magnetic layer and the second amorphous soft magnetic layer. Preferably, a material used for the, non-magnetic layer is Ru or Cu in the case of using the amorphous alloy mainly composed of Co for the first amorphous soft magnetic layer and the second amorphous soft magnetic layer, or it is Cr in the case of using the amorphous alloy mainly composed of Fe for the first amorphous soft magnetic layer and the second amorphous soft magnetic layer.

The thickness of the non-magnetic layer may be set to antiferromagnetically couple the first amorphous soft magnetic layer and the second amorphous soft magnetic layer. For example, when the amorphous alloy mainly composed of Co is used for the first amorphous soft magnetic layer and the second amorphous soft magnetic layer and Ru is used for the non-magnetic layer, preferably, the thickness of the Ru layer is set to 0.5 to 1.0 nm. Upon strengthening the antiferromagnetic coupling acting between the first amorphous soft magnetic layer and the second amorphous soft magnetic layer, advantageously, the non-magnetic portion is replaced by a sandwich structure consisting of the non-magnetic layer and two thin ferromagnetic layers with the thickness of 1 to 5 nm. Specifically, a tri-layer film such as Co/Ru/Co or Fe/Cr/Fe is used.

In the heat treatment in a magnetic field to apply the exchange bias to the first amorphous soft magnetic layer, the first amorphous soft magnetic layer is formed and, then, it is heated approximately to the blocking temperature of the antiferromagnetic layer. The first amorphous soft magnetic layer is cooled while the magnetic filed is applied in the radial direction of the disk substrate. The magnetic field needs to be set so that, at least, the magnetization of the first amorphous soft magnetic layer is substantially saturated and the magnetic field of approximately 8 kA/m or more may be applied on the disk substrate.

The cooling temperature is preferably reduced to the room temperature. However, actually, the cooling temperature is reduced to 60° C. in view of the reduction of the medium formation manufacturing processing. The heat treatment in the magnetic filed is performed after forming the first amorphous soft magnetic layer. However, the heat treatment in the magnetic field may be performed through the medium formation processing after forming the second amorphous soft magnetic layer, or after forming the perpendicular recording layer.

Since the non-magnetic layer formed between the first amorphous soft magnetic layer and the second amorphous soft magnetic layer is very thin, the interfacial diffusion is caused in the heat treatment depending on the combination of materials, and the antiferromagnetic coupling might not be obtained. When the non-magnetic layer is replaced by the tri-layer film including Co/Ru/Co as mentioned above, the interfacial diffusion of the heat treatment is suppressed and the desired property can be obtained.

The perpendicular recording layer is formed on the soft magnetic underlayer via an intermediate layer and, then, the medium noise is suppressed.

The intermediate layer uses the non-magnetic alloy having an amorphous or hexagonal closed packed structure or a face-centered cubic structure. The intermediate layer maybe a single-layer film or a laminated film using materials having different crystal structures. The perpendicular recording layer uses a super-lattice film such an hcp-Co alloy film of a CoCrPt alloy or a CoCrPtB alloy, a granular film containing CoCrPt-SiO2, a Co/Pd multi-layer film, CoB/Pd multi-layer film, CoSi/Pd multilayer film, a Co/Pt multilayer film, a CoB/Pt multilayer film, and a CoSi/Pt multilayer film.

As a protective layer of the perpendicular recording layer, a film having the thickness of 3 nm or more and 10 nm or less mainly composed of carbon is formed, and a lubricant layer such as perfluoroalkylpolyether is formed. Thus, the perpendicular recording medium is obtained with high reliability.

According to the present invention, there is provided a magnetic storage apparatus comprising: the perpendicular magnetic recording medium having a perpendicular recording layer on a substrate via a soft magnetic underlayer; a driving section which drive the perpendicular magnetic recording medium in a recording direction; a magnetic head having a recording section and a reproducing section; a unit which relatively moves the magnetic head to the perpendicular magnetic recording medium; and a recording/reproducing processing unit which inputs a signal from the magnetic head and reproduces an output signal from the magnetic head, wherein the recording section of the magnetic head comprises a single-pole-type head, and the reproducing section of the magnetic head comprises a high-sensitive element using a magnetoresistive effect or tunneling magnetoresistive effect. Thus, the magnetic storage apparatus is realized with the a real recording density of 7.75 Gbit per square centimeter and with high reliability.

DESCRIPTION OF THE PREFERRED EMBODIMENTS

Herein below, embodiments of the present invention will be described with reference to the drawings.

(First Embodiment)

Figure 1:
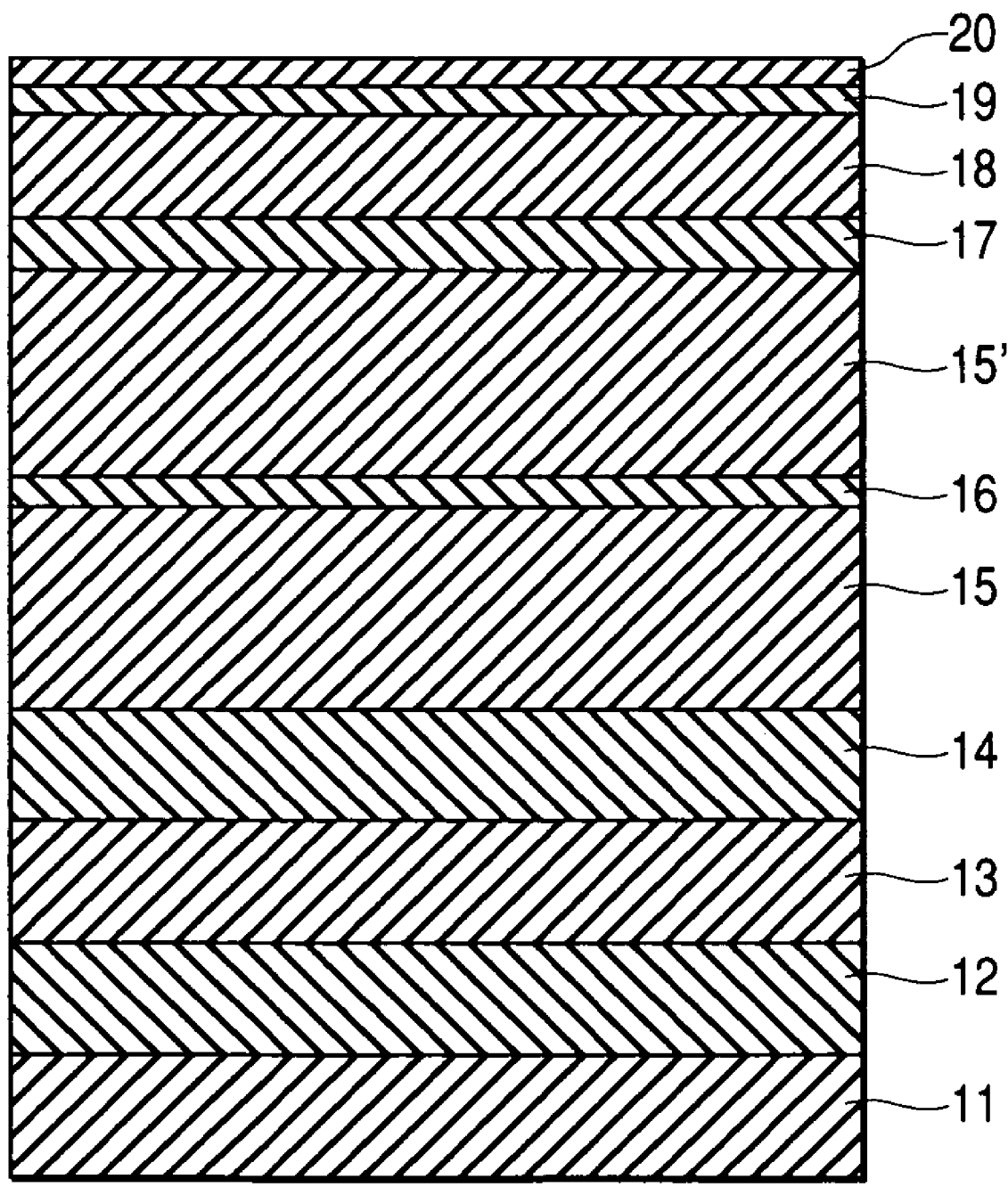
FIG. 1 is a diagram showing the layer structure of a perpendicular magnetic recording medium according to the first embodiment of the present invention.

FIG. 1 shows the layer structure of a perpendicular magnetic recording medium according to the first embodiment. A 2.5-type glass disk is employed as a substrate 11. Sequentially formed on the substrate 11 are a pre-coating layer 12, an fcc-metal layer 13, an antiferromagnetic layer 14, and a first amorphous soft magnetic layer 15, by sputtering. Then, the substrate 11 is heated approximately to 200° C. by a lamp heater and is cooled to approximately 60° C. in a magnetic field. The magnetic field upon cooling is directed from the outer periphery to the inner periphery along the radial of the disk substrate. The magnetic field ranges from 8 kA/m to 10 kA/m on the disk substrate. Then, a non-magnetic layer 16, a second amorphous soft magnetic layer 15', an intermediate layer 17, a perpendicular recording layer 18, and a protective layer 19 are sequentially formed on the substrate 11. Table 1 shows a target composition, an Ar gas pressure, and the thickness which are used for the manufacture of layers. A lubricant layer 20 is formed by coating a perfluoroalkylpolyether material diluted with a fluorocarbon material.

TABLE 1

|  | Target composition | P_Ar (Pa) | Thickness (nm) |
| --- | --- | --- | --- |
| Pre-coating layer | 52.5at % Ni-37.5at % Ta-10at % Zr | 1 | 30 |
| fcc-metal layer | Pd | 0.5 | 5 |
|  | 8Iat % Ni-I9at % Fe | 0.5 | 5 |
| Antiferromagnetic layer | 20at % Ir-80at % Mn | 1 | 10 |
|  | 50at % Fe-50at % Mn | 1 | 10 |
| 1st soft magnetic layer | 92at % Co-3at % Ta-5at % Zr | 0.5 | 50, 100 |
|  | 52at % Fe-28at % Co-20at % B | 0.5 | 50, 100 |
| Non-magnetic layer | Ru | 0.5 | 0.8 |
|  | Cr | 0.5 | 0.8 |

TABLE 1-continued

|  | Target composition | P_Ar (Pa) | Thickness (nm) |
|---|---|---|---|
| 2nd soft magnetic layer | 92at % Co-3at % Ta-5at % Zr | 0.5 | 100 |
|  | 52at % Fe-28at % Co-20at % B | 0.5 | 100 |
| Intermediate layer | Ru | 1 | 20 |
| Perpendicular rec. layer | (73at % Co-13at % Cr-14at % Pt) + SiO2 | 1 | 18 |
| Protective layer | Carbon | 1 | 5 |

Figure 2:
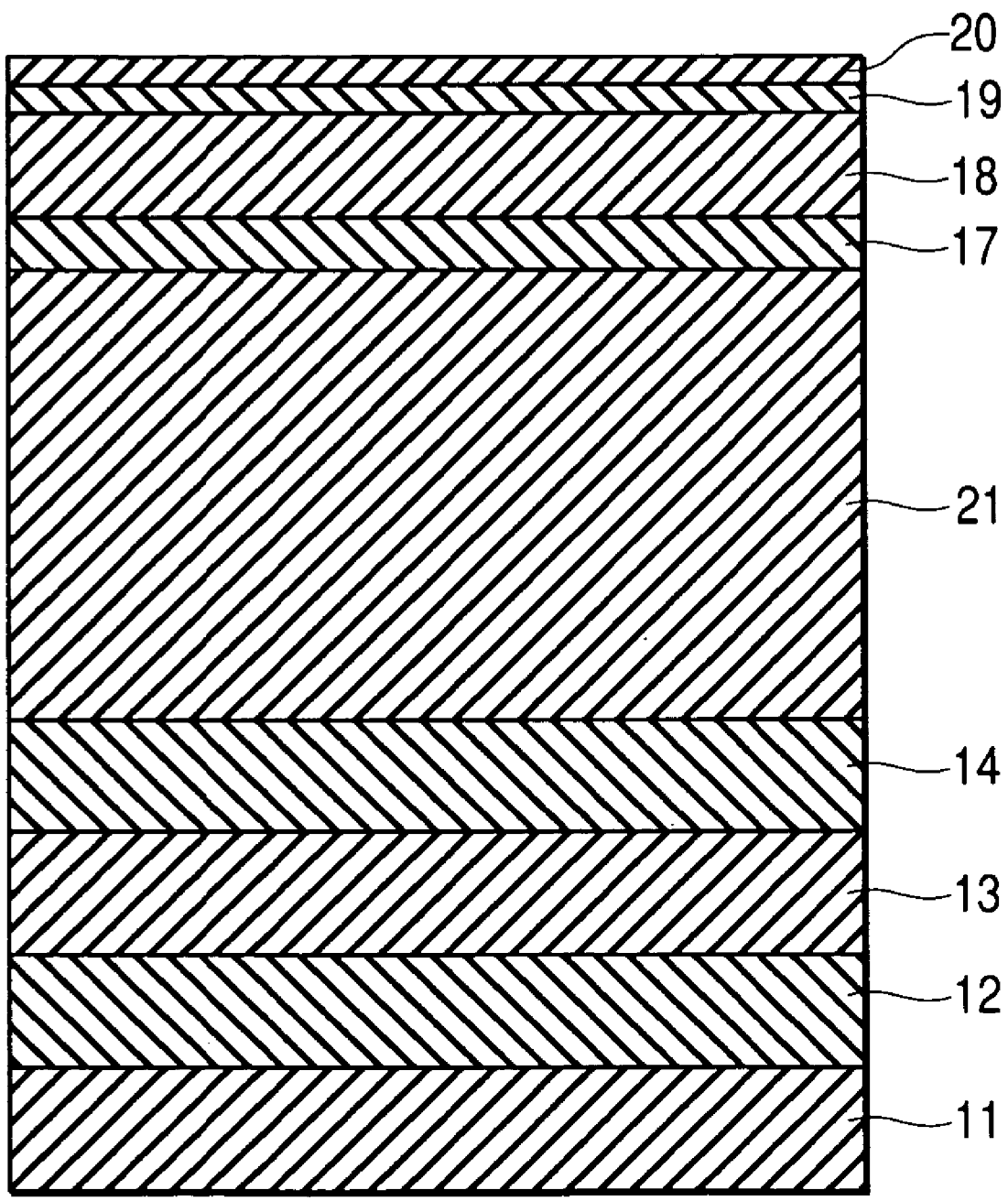
FIG. 2 is a diagram showing the layer structure of a perpendicular magnetic recording medium according to one comparison according to the first embodiment of the present invention.
Figure 3:
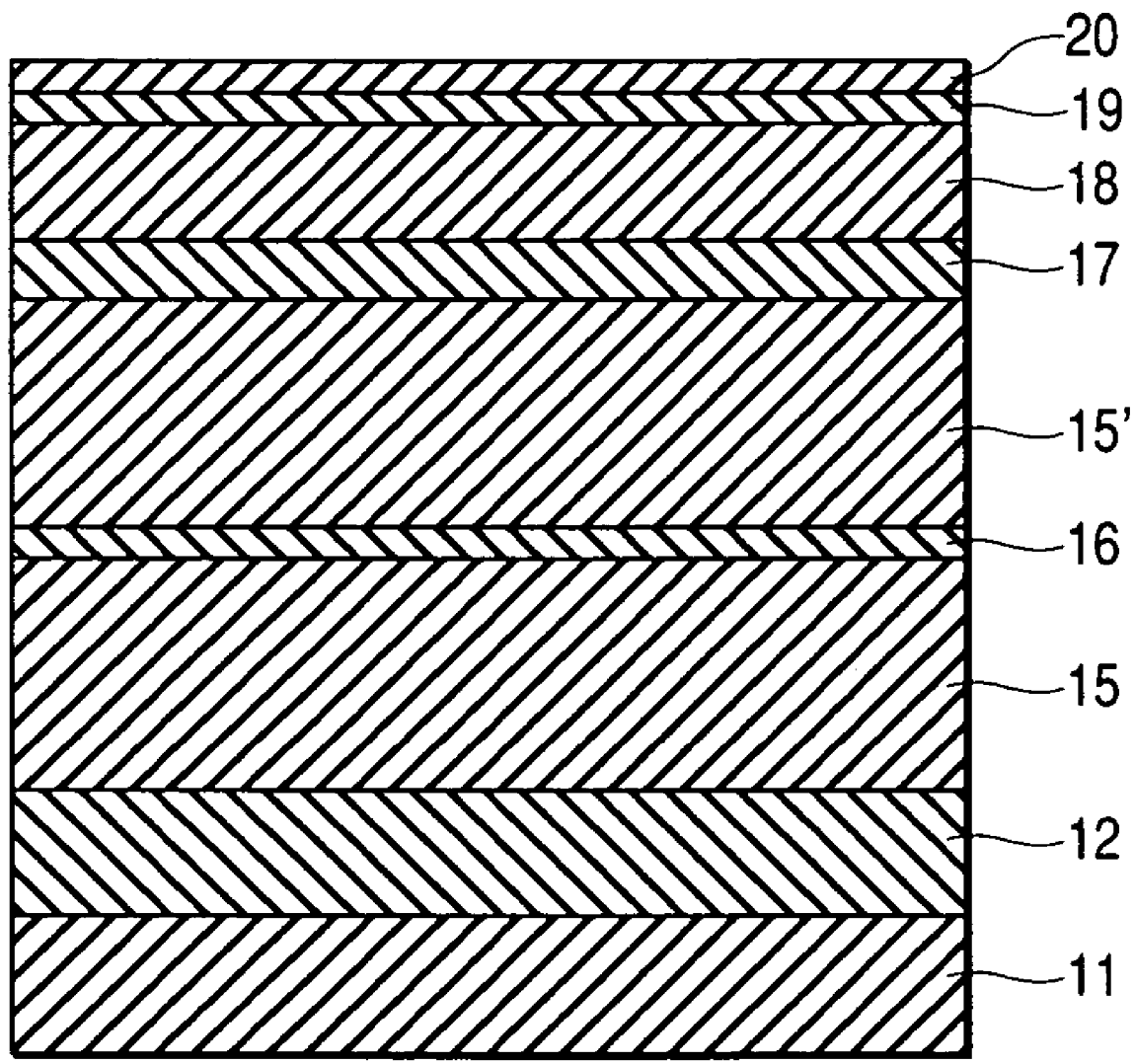
FIG. 3 is a diagram showing the layer structure of a perpendicular magnetic recording medium according to another comparison according to the first embodiment of the present invention.

For comparison, a sample using a soft magnetic layer 21 having a mono-layer film, not sandwiching the non-magnetic layer, as shown in FIG. 2 and a sample obtained by directly forming the first amorphous soft magnetic layer 15 on the pre-coating layer as shown in FIG. 3, are prepared.

Figure 4:
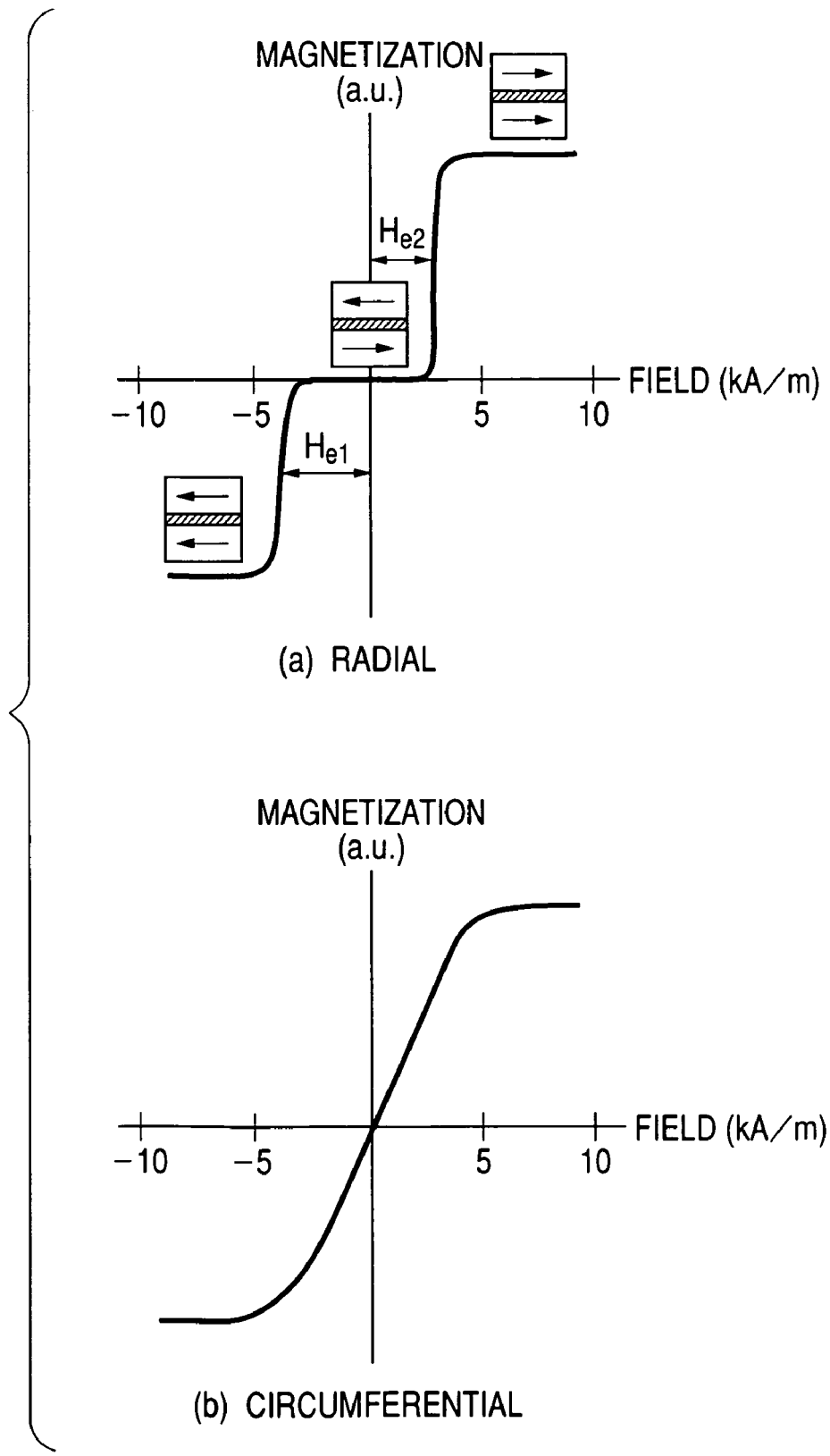
FIG. 4 is a magnetization curve of a soft magnetic underlayer according to the first embodiment of the present invention.

FIG. 4 shows one example of a magnetization curve of the soft magnetic underlayer according to the first embodiment. The magnetization curve measured by applying the magnetic field in the radial direction to the disk substrate is step-shaped with a stable magnetization level within a range of magnetic field including a zero-magnetic field (in an antiparallel state of the magnetization of the first amorphous soft magnetic layer and the magnetization of the second amorphous soft magnetic layer). Further, the magnetization curve is characterized in that the absolute of a center value He1 of the switching field from the saturation magnetization in the negative magnetic field to the magnetization level is different from the absolute of a center value He2 of the switching field from the saturation magnetization in the positive magnetic field to the magnetization level.

Because only the exchange field is applied to the second amorphous soft magnetic layer 15' from the first amorphous soft magnetic layer, while the exchange bias field from the antiferromagnetic layer and the exchange field from the second amorphous soft magnetic layer 15' are applied to the first amorphous soft magnetic layer. On the other hand, in the magnetization curve measured by applying the magnetic field in the circumferential direction of the disk substrate, the magnetization linearly changes in accordance with the magnetic field.

Figure 5:
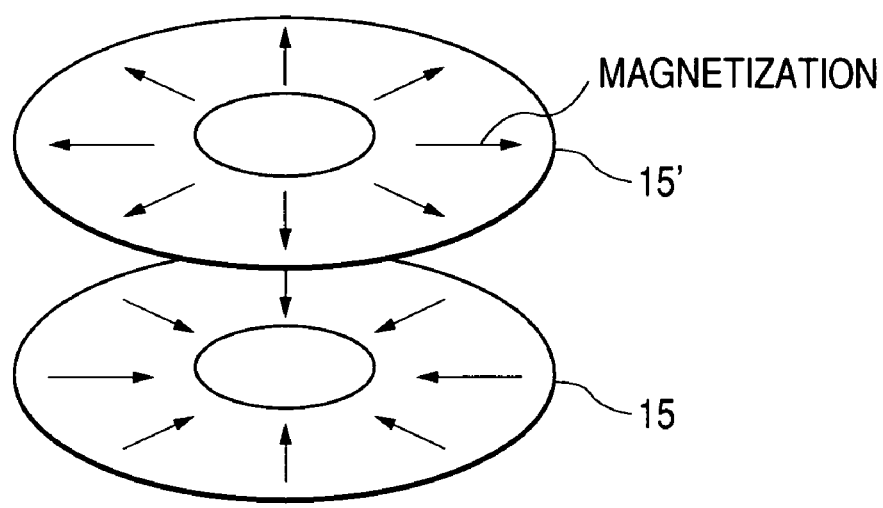
FIG. 5 is a schematic diagram of a magnetization state of the soft magnetic underlayer according to the first embodiment of the present invention.

FIG. 5 shows a schematic diagram showing the residual magnetization of the soft magnetic underlayer which is assumed based on the magnetization curve. The magnetization of the first amorphous soft magnetic layer 15 is substantially directed from the outside to the inside along the radius of disk substrate, and the magnetization of the second amorphous soft magnetic layer 15' is substantially directed from the inside to the outside along the radius of disk substrate. The first amorphous soft magnetic layer 15 and the second amorphous soft magnetic layer 15' have a quasi-single domain structure.

Figure 6A:
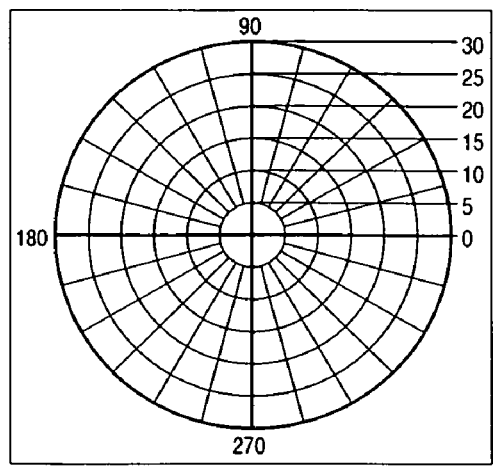
FIG. 6 is a diagram showing the distribution of spike noise according to the first embodiment of the present invention.
Figure 6B:
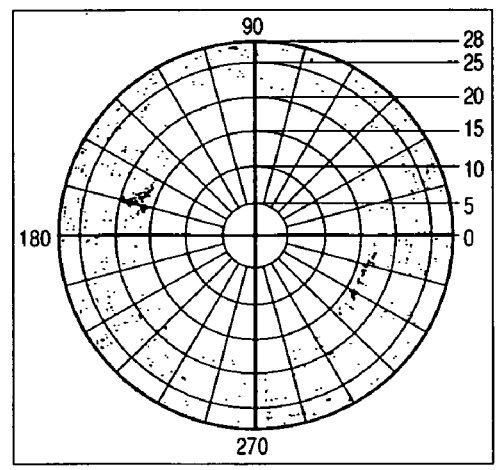

FIG. 6 shows an example of a map of the spike noises in the media according to the first embodiment and in the media according to the comparisons. The disk-radial range of 16 to 30 mm is evaluated at the pitch of 100 μm by using a spin stand and a digital oscilloscope. The spike noises distributed like points are observed as well as the large spike noises due to the domain wall in a medium I using the soft magnetic underlayer of the mono-layer film according to the comparison. However, clear spick noises are not detected in a medium A according to the first embodiment.

Table 2 shows the evaluation result of spike noises and modulation in output signal for the media according to the first embodiment.

TABLE 2

| MEDIUM | LAYER STRUCTURE OF SOFT MAGNETIC UNDERLAYER (Numbers in parentheses indicate the thickness of each layer) unit: nm | He1 (kA/m) | He2 (kA/m) | SPIKE NOISE | MODULATION |
|---|---|---|---|---|---|
| A | Pd(5)/IrMn(10)/CoTaZr(100)/Ru(0.8)/CoTaZr(100) | 3.51 | 2.49 | NONE | NONE |
| B | NiFe(5)/IrMn(10)/CoTaZr(100)/Ru(0.8)/CoTaZr(100) | 3.42 | 2.51 | NONE | NONE |
| C | NiFe(5)/FeMn(10)/CoTaZr(100)/Ru(0.8)/CoTaZr(100) | 3.01 | 2.52 | NONE | VISIBLE |
| D | NiFe(5)/FeMn(10)/CoTaZr(50)/Ru(0.8)/CoTaZr(50) | 6.02 | 4.98 | NONE | NONE |
| E | Pd(5)/IrMn(10)/FeCoB(100)/Cr(0.8)/FeCoB(50) | 3.40 | 2.61 | NONE | NONE |
| F | NiFe(5)/IrMn(10)/FeCoB(100)/Cr(0.8)/FeCoB(100) | 3.30 | 2.58 | NONE | NONE |
| G | NiFe(5)/FeMn(10)/FeCoB(100)/Cr(0.8)/FeCoB(100) | 2.90 | 2.63 | NONE | VISIBLE |

TABLE 2-continued

| MEDIUM | LAYER STRUCTURE OF SOFT MAGNETIC UNDERLAYER (Numbers in parentheses indicate the thickness of each layer) unit: nm | He1 (kA/m) | He2 (kA/m) | SPIKE NOISE | MODULATION |
|---|---|---|---|---|---|
| H | NiFe(5)/FeMn(10)/FeCoB(50)/Cr(0.8)/FeCoB(50) | 5.82 | 5.20 | NONE | NONE |
| I (COMPARISON) | Pd(5)/IrMn(10)/CoTaZr(200) | 0.50 | — | VISIBLE | VISIBLE |
| J (COMPARISON) | CoTaZr(100)/Ru(0.8)/CoTaZr(100) | 2.52 | 2.52 | NONE | VISIBLE |

The modulation in output signal is observed in media C and G having a small difference between the center values He1 and He2 of the soft magnetic underlayer and in a medium J of the comparison using no exchange bias field from the antiferromagnetic layer. It is because the first amorphous soft magnetic layer 15 and the second amorphous soft magnetic layer 15' have a multi-domain structure in the medium J of the comparison. In the media C and G, an FeMn alloy is used for the antiferromagnetic layer 14, and the thickness of the first amorphous soft magnetic layer 15 is thick, e.g., 100 nm and, then, the exchange bias field is not sufficiently applied. As a consequence, a quasi-single domain structure of the first amorphous soft magnetic layer 15 is not realized.

The spike noises of the media C, G, and J are not clearly observed. It is because the magnetizations of the first amorphous soft magnetic layer 15 and the second amorphous soft magnetic layer 15' are antiparallel by the interlayer exchange-coupling. By using the IrMn alloy, which enables a relatively high exchange bias, for the antiferromagnetic layer 14, even when the thickness of the first amorphous soft magnetic layer 15 is 100 nm, the modulation in output signal is suppressed.

Figure 7:
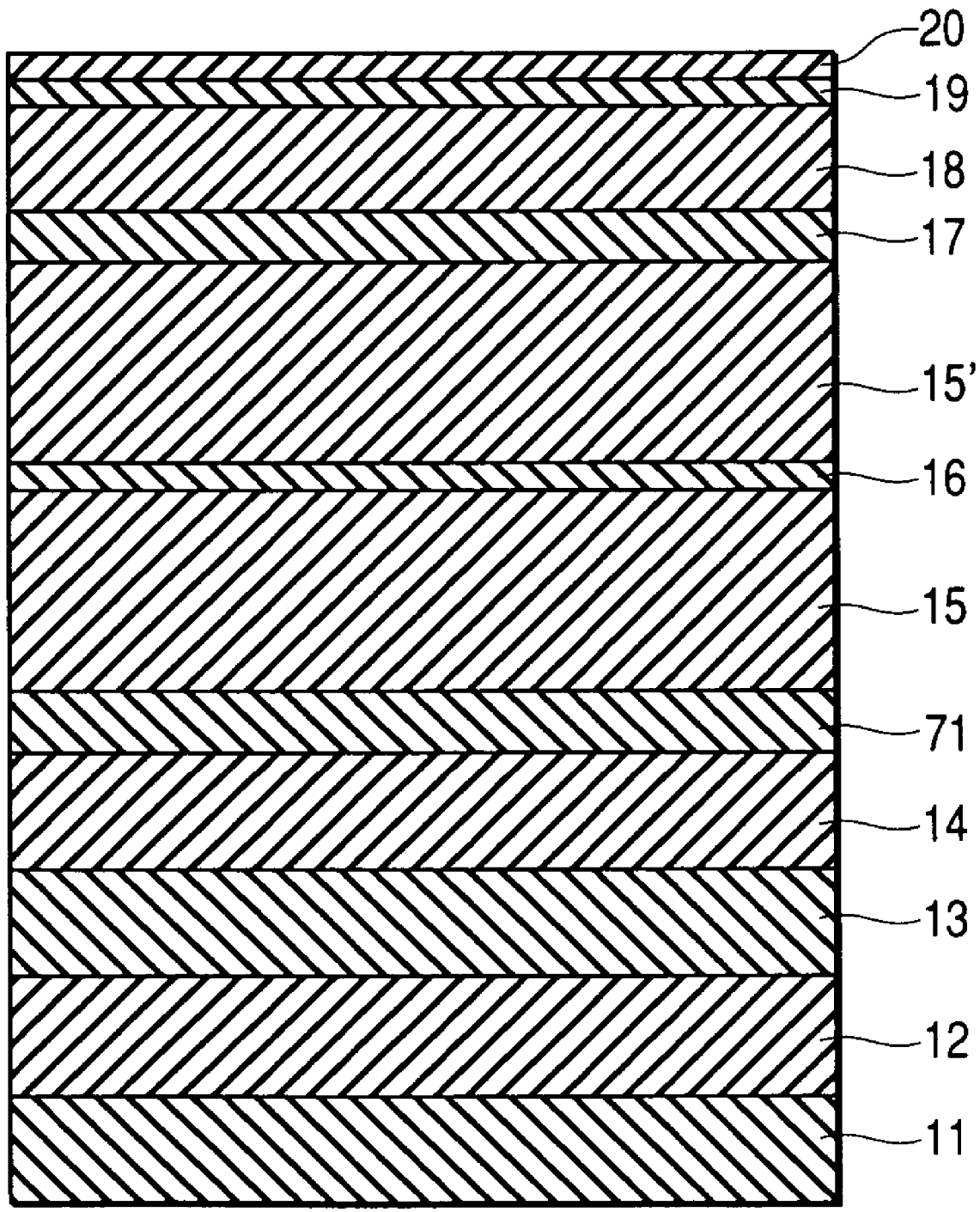
FIG. 7 is a diagram showing one example of the layer structure of a perpendicular magnetic recording medium according to the second embodiment of the present invention.

As mentioned above, both the first amorphous soft magnetic layer and the second amorphous soft magnetic layer have the quasi-single domain in the soft magnetic underlayer of the present invention. Further, a closure loop of magnetic flux is formed when the thickness of the first amorphous soft magnetic layer is equal to that of the second amorphous soft magnetic layer. Thus, advantageously, the spike noises and the modulation in output signal are suppressed. According to the first embodiment, the first amorphous soft magnetic layer is directly formed on the antiferromagnetic layer. However, the first amorphous soft magnetic layer is formed via a ferromagnetic layer 71 as shown in FIG. 7 and then the exchange bias field is enhanced. Advantageously, the modulation in output signal is suppressed. Table 3 shows the evaluation result in the case of using the 70 at %Co-30 at %Fe alloy layer having the thickness of 2.5 nm as the ferromagnetic layer 71.

TABLE 3

| MEDIUM | LAYER STRUCTURE OF SOFT MAGNETIC UNDERLAYER (Numbers in parentheses indicate the thickness of each layer) unit: nm | He1 (kA/m) | He2 (kA/m) | SPIKE NOISE | MODULATION |
|---|---|---|---|---|---|
| K | Pd(5)/IrMn(10)/CoFe(2.5)/CoTaZr(100)/Ru(0.8)/CoTaZr(100) | 4.91 | 2.50 | NONE | NONE |
| L | NiFe(5)/FeMn(10)/CoFe(2.5)/CoTaZr(100)/Ru(0.8)/CoTaZr(100) | 3.70 | 2.51 | NONE | NONE |

(Second Embodiment)

Figure 8:
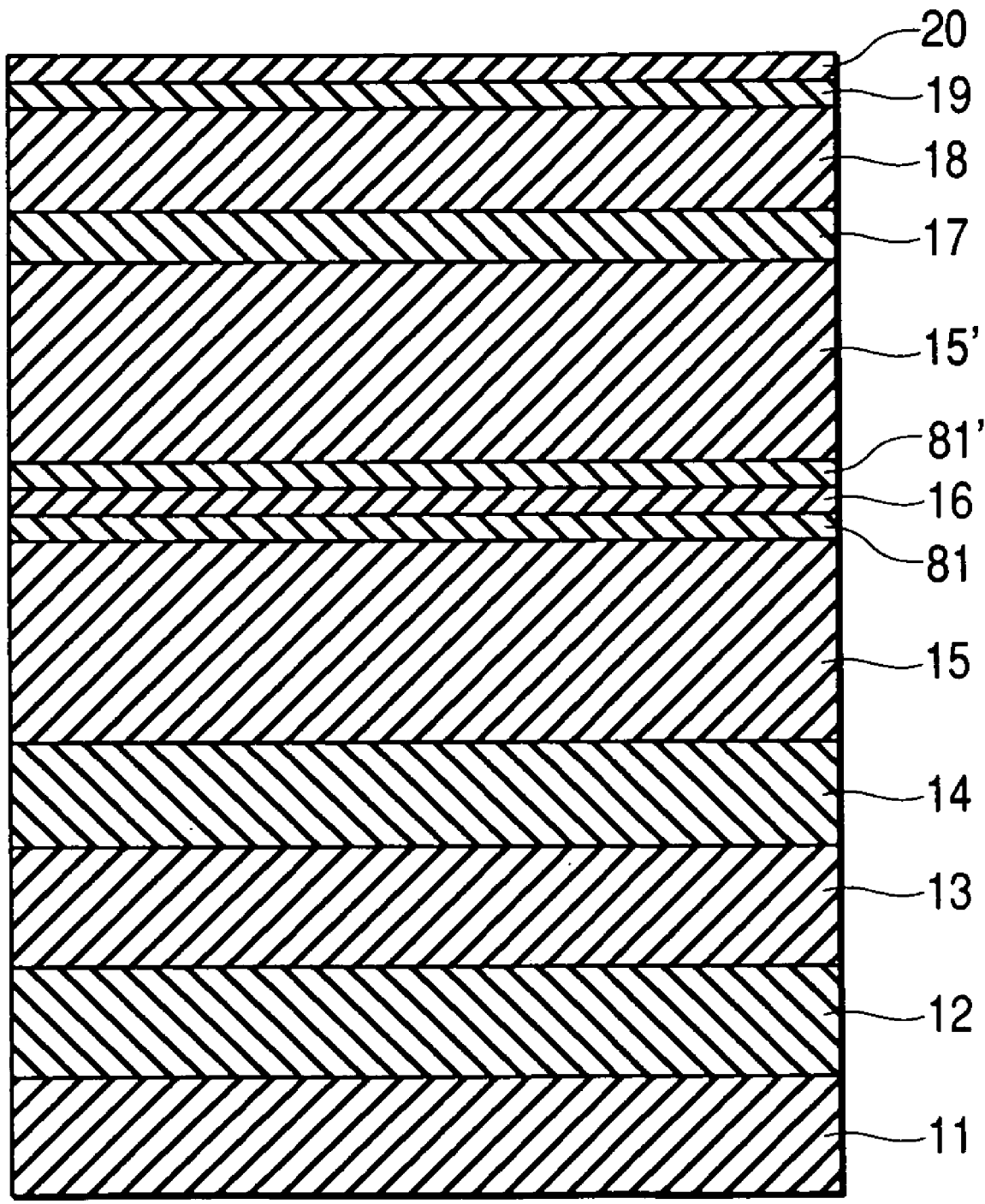
FIG. 8 is a diagram showing another example of the layer structure of the perpendicular magnetic recording medium according to the second embodiment of the present invention.

FIG. 8 shows the layer structure of a perpendicular magnetic recording medium according to the second embodiment of the present invention. A 2.5-type glass disk is employed as the substrate 11. Sequentially formed on the substrate 11 are the pre-coating layer 12, the fcc-metal layer 13, the antiferromagnetic layer 14, the first amorphous soft magnetic layer 15, a first ferromagnetic layer 81, the non-magnetic layer 16, a second ferromagnetic layer 81', and a second amorphous soft magnetic layer 15' by sputtering. Then, the substrate 11 is heated to approximately 250° C. by a lamp heater, the intermediate layer 17, and the perpendicular recording layer 18 are sequentially formed on the substrate 11, and the substrate 11 is then cooled approximately to 60° C. in a magnetic field. The substrate temperature just before entering a cooling unit with a magnetic field is approximately 200° C. The magnetic field upon cooling is directed from the outer periphery to the inner periphery along the radius of the disk substrate. The magnetic field ranges from 8 kA/m to 10 kA/m on the disk substrate. Then, the protective layer 19 is formed. Table 4 shows a target composition, an Ar gas pressure, and the thickness which are used for the manufacture of layers. The lubricant layer 20 is formed by coating a perfluoroalkylpolyether material diluted with a fluorocarbon material.

TABLE 4

|  | Target composition | P_Ar (Pa) | Thickness (nm) |
| --- | --- | --- | --- |
| Pre-coating layer | 52.5at % M-37.5at % Ta-10at % Zr | 1 | 30 |
| fcc-metal layer | 81at % Ni-19at % Fe | 0.5 | 5 |
| Antiferromagnetic layer | 20at % Ir-80at % Mn | 1 | 10 |
| 1st soft magnetic layer | 92at % Co-3at % Ta-5at % Zr | 0.5 | 100 |
|  | 52at % Fe-28at % Co-20at % B | 0.5 | 100 |
| Non-magnetic layer | Ru | 0.5 | 0.8 |
| Ferromagnetic layer | Co | 0.5 | 1.0 |
| 2nd soft magnetic layer | 92at % Co-3at % Ta-5at % Zr | 0.5 | 100 |
|  | 52at % Fe-28at % Co-20at % B | 0.5 | 100 |
| Intermediate layer | 52.5at % Ni-37.5at % Ta-10at % Zr | 1 | 2 |
|  | 60at % Co-40at % Cr | 1 | 3 |
| Perpendicular rec. layer | 65at % Co-17at % Cr-14at % Pt-4at % B | 1 | 18 |
| Protective layer | Carbon | 1 | 5 |

According to the second embodiment, a magnetization curve measured by applying the magnetic field in the radial direction to the disk substrate is step-shaped with a stable magnetization level within a range of magnetic field including a zero-magnetic field, similarly to the case according to the first embodiment. Referring to Table 5, the exchange field acting between the first amorphous soft magnetic layer and the second amorphous soft magnetic layer has a value larger than that according to the first embodiment. This indicates that the Co/Ru/CO tri-layer film formed between the first amorphous soft magnetic layer and the second amorphous soft magnetic layer stably exists after the heating treatment. According to the second embodiment, when the intermediate layer and the perpendicular recording layer are formed at a elevated temperature, preferably, the cooling is performed in the magnetic filed after forming the perpendicular recording layer in view of sufficiently applying the exchange bias field. The above-mentioned heat resistance at interface is a necessary characteristic.

(Third Embodiment)

Figure 9:
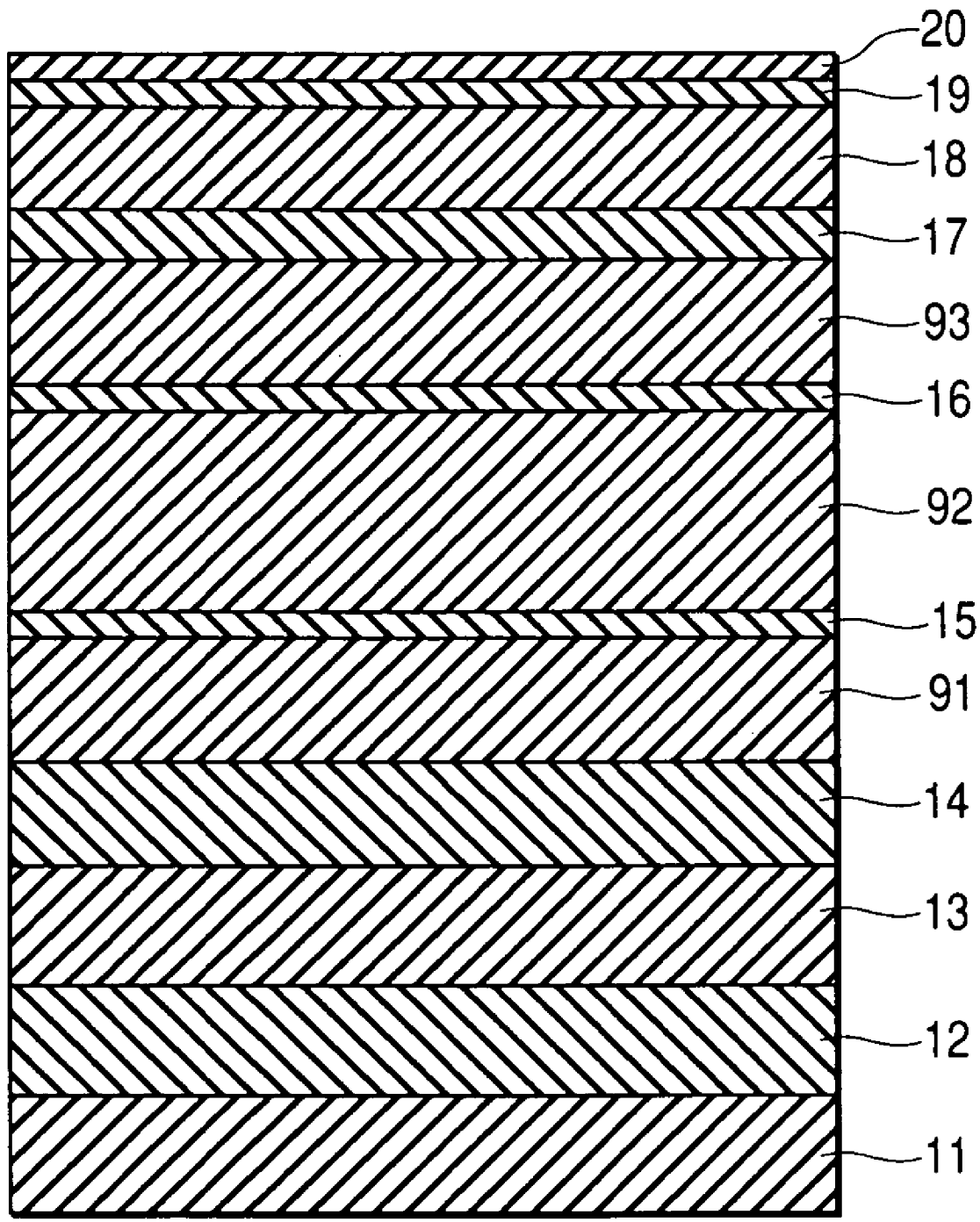
FIG. 9 is a diagram showing the layer structure of a perpendicular magnetic recording medium according to the third embodiment of the present invention.

FIG. 9 shows the layer structure of a perpendicular magnetic recording medium according to the third embodiment of the present invention. A 2.5-type glass disk is employed as the substrate 11. Sequentially formed on the substrate 11 are the pre-coating layer 12, the fcc-metal layer 13, the antiferromagnetic layer 14, and a first amorphous soft magnetic layer 91, by sputtering. Then, the substrate 11 is heated approximately to 200° C. by a lamp heater, and the substrate 11 is then cooled approximately to 60° C. in a magnetic field. The magnetic field upon cooling is directed from the outer periphery to the inner periphery along the radius of the disk substrate. The magnetic field ranges from 8 kA/m to 10 kA/m on the disk substrate.

After that, sequentially formed on the substrate 11 are the first non-magnetic layer 16, a second amorphous soft magnetic layer 92, a second non-magnetic layer 16', a third

TABLE 5

| MEDIUM | LAYER STRUCTURE OF SOFT MAGNETIC UNDERLAYER | He1 (kA/m) | He2 (kA/m) | SPIKE NOISE | MODULATION |
| --- | --- | --- | --- | --- | --- |
| M | NiFe(5)/IrMn(10)/CoTaZr(100)/Co(1.0)/Ru(0.8)/Co(1.0)/CoTaZr(100) | 4.99 | 3.98 | NONE | NONE |
| N | NiFe(5)/IrMn(10)/FeCoB(100)/Co(1.0)/Ru(0.8)/Co(1.0)/FeCoB(100) | 3.59 | 2.68 | NONE | NONE |

As mentioned above, the heating treatment in the magnetic field for applying the exchange bias to the first amorphous soft magnetic layer is not necessarily performed after forming the first amorphous soft magnetic layer. It may be performed after forming the second amorphous soft magnetic layer through the medium formation processing or after forming the perpendicular recording layer.

amorphous soft magnetic layer 93, the intermediate layer 17, the perpendicular recording layer 18, and the protective layer 19. Table 6 shows the target composition, the Ar gas pressure, and the thickness which are used for the manufacture of layers. The lubricant layer 20 is formed by coating the perfluoroalkylpolyether material diluted with a fluorocarbon material.

TABLE 6

|  | Target composition | P_Ar (Pa) | Thickness (nm) |
| --- | --- | --- | --- |
| Pre-coating layer | 52.5at % Ni-37.5at % Ta-10 at % Zr | 1 | 30 |
| fcc-metal layer | 81at % Ni-19at % Fe | 0.5 | 5 |
| Antiferromagnetic layer | 50at % Fe-50at % Mn | 1 | 10 |
| 1st soft magnetic layer | 92at % Co-3at % Ta-5at % Zr | 0.5 | 50 |
|  | 52at % Fe-28at % Co-20at % B | 0.5 | 50 |
| Non-magnetic layer | Ru | 0.5 | 0.8 |
| 2nd soft magnetic layer | 92at % Co-3at % Ta-5at % Zr | 0.5 | 100 |
|  | 52at % Fe-28at % Co-20at % B | 0.5 | 100 |

TABLE 6-continued

| | Target composition | P_Ar (Pa) | Thickness (nm) |
|---|---|---|---|
| 3rd soft magnetic layer | 92at % Co-3at % Ta-5at % Zr | 0.5 | 50 |
| | 52at % Fe-28at % Co-20at % B | 0.5 | 50 |
| Intermediate layer | Ru | 1 | 20 |
| Perpendicular rec. layer | (73at % Co-13at % Gr-14at % Pt) + SiO2 | 1 | 18 |
| Protective layer | Carbon | 1 | 5 |

Figure 10:
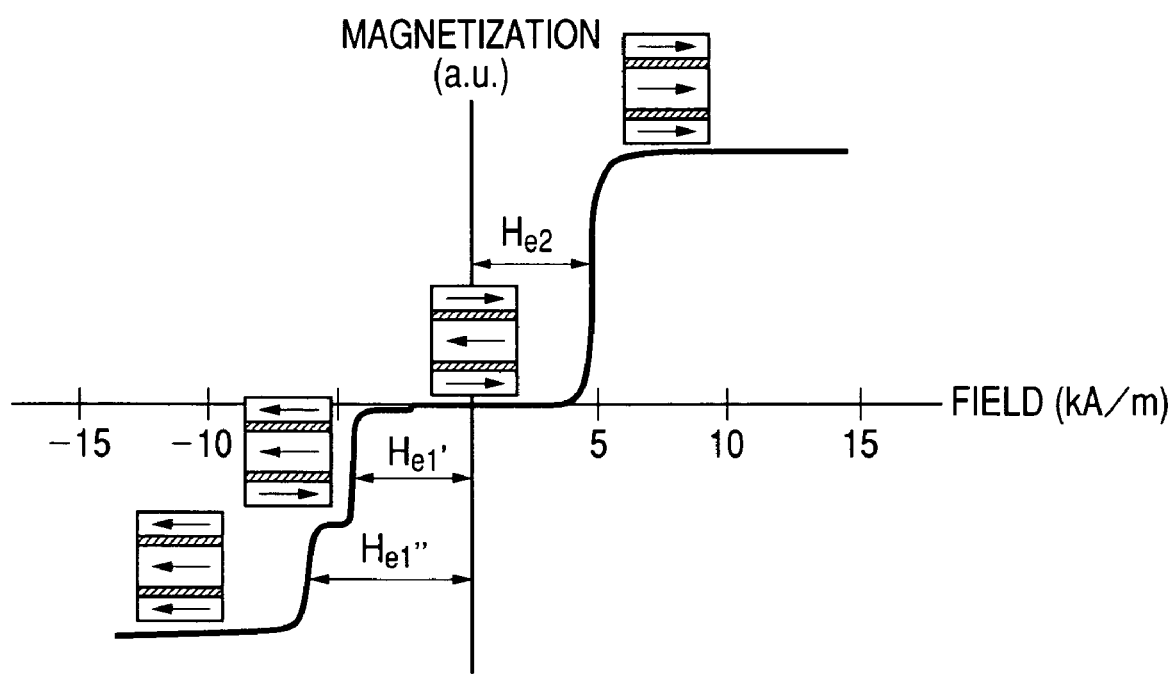
FIG. 10 is a schematic diagram of one magnetization state of the soft magnetic underlayer according to the third embodiment of the present invention.

FIG. 10 shows one example of the magnetization curve of the soft magnetic underlayer according to the third embodiment. Here, the magnetic field is applied in the radial direction of the disk substrate. Referring to FIG. 10, the magnetization state of the soft magnetic layers are shown and four stable magnetization levels exist depending on the applied magnetic field.

Figure 11:
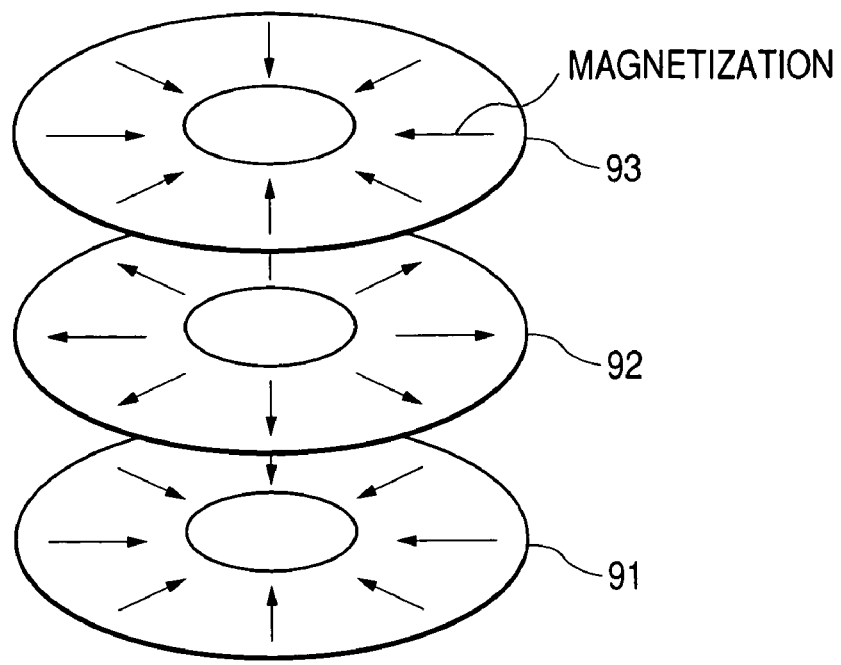
FIG. 11 is a magnetization curve of the soft magnetic underlayer according to the third embodiment of the present invention.

FIG. 11 shows a schematic diagram showing the residual magnetization of the soft magnetic underlayer which is assumed based on the magnetization curve. The magnetization of the first amorphous soft magnetic layer 91 and the third amorphous soft magnetic layer 93 is substantially directed from the outside to the inside along the radius of the disk substrate. The magnetization of the second amorphous soft magnetic layer 92 is substantially from the inside to the outside along the radius of the disk substrate. The three amorphous soft magnetic layers have a quasi-single domain structure. According to the third embodiment, the sum of the thickness of the first amorphous soft magnetic layer and the third amorphous soft magnetic layer is equal to the thickness of the second amorphous soft magnetic layer. Therefore, the magnetic flux feeds back between the three layers.

Figure 12:
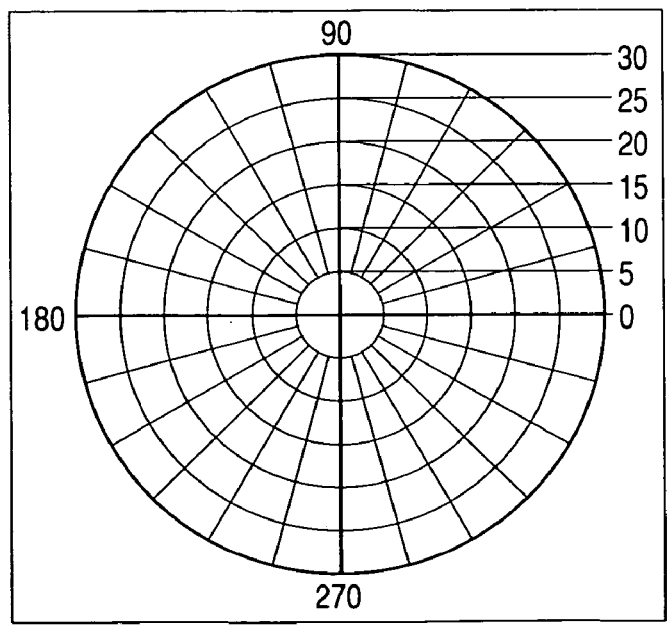
FIG. 12 is a diagram showing the distribution of spike noise according to the third embodiment of the present invention.

Table 7 shows the switching field obtained from the magnetization curve (magnetic field at which the magnetization level is changed) and the evaluation results of the spike noise and the modulation in output signal. According to the third embodiment, the FeMn alloy is used for the antiferromagnetic layer 14. However, since the thickness of the first amorphous soft magnetic layer is thin, e.g., 50 nm, the exchange bias field is sufficiently applied to the first amorphous soft magnetic layer. The spike noise and the modulation in output signal are suppressed. FIG. 12 shows a map of the spike noises in a media P as an example.

10% is 0.8 kA/m for the medium I according to the comparison, while the external magnetic fields are 2.2 kA/m and 5 kA/m for the medium A using the soft magnetic bi-layer and the medium P using the soft magnetic tri-layer, respectively. Obviously, the external field robustness is improved.

(Fourth Embodiment)

Figure 15:
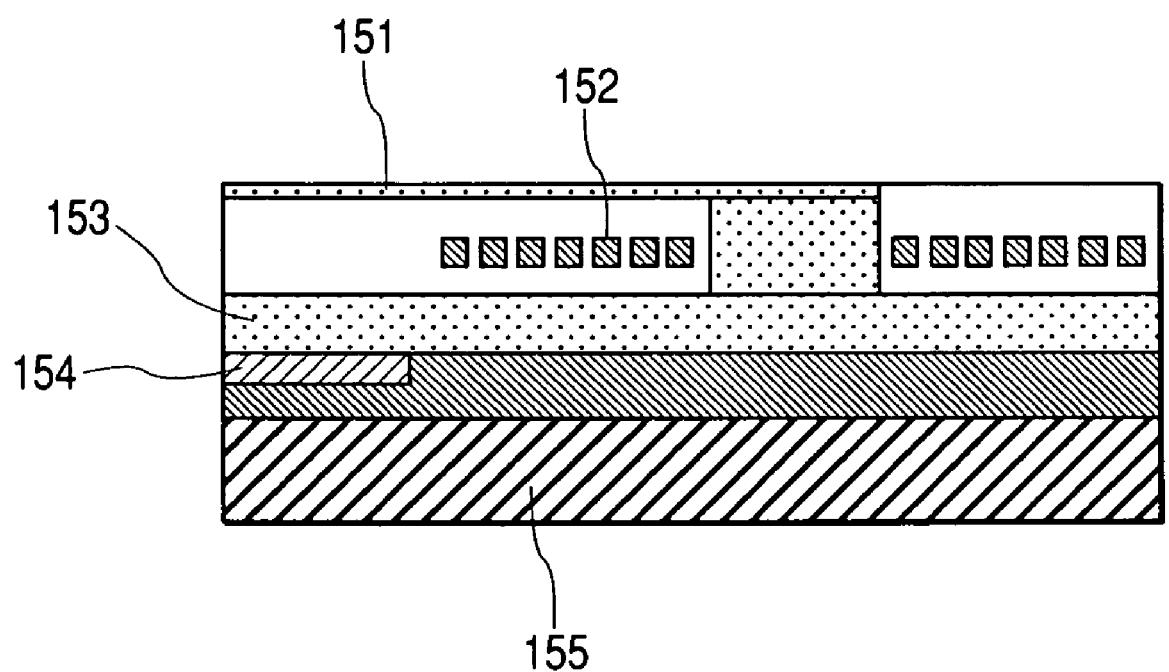
FIG. 15 is a cross-sectional view showing a read/write separating head according to the fourth embodiment of the present invention.

The read/write operation is performed under the condition that the head flying height is 10 nm, by using the medium A according to the first embodiment, a single-pole-type head for reading with the track width of 0.25 μm, and a GMR head for writing with the shield gap of 0.08 μm and with the track width of 0.22 μm. The error rate of a wave form of signals is evaluated through an EEPR4-system signal processing circuit and then the level of the error rate is $10^{-6}$ or less under the condition of the a real recording density of 7.75 Gbit per square centimeter. Referring to FIG. 15, the magnetic head for the evaluation has a well-known structure including a main pole 151, a recording coil 152, an auxiliary pole/upper shield 153, a GMR element 154, and a lower shield 155.

Figure 16A:
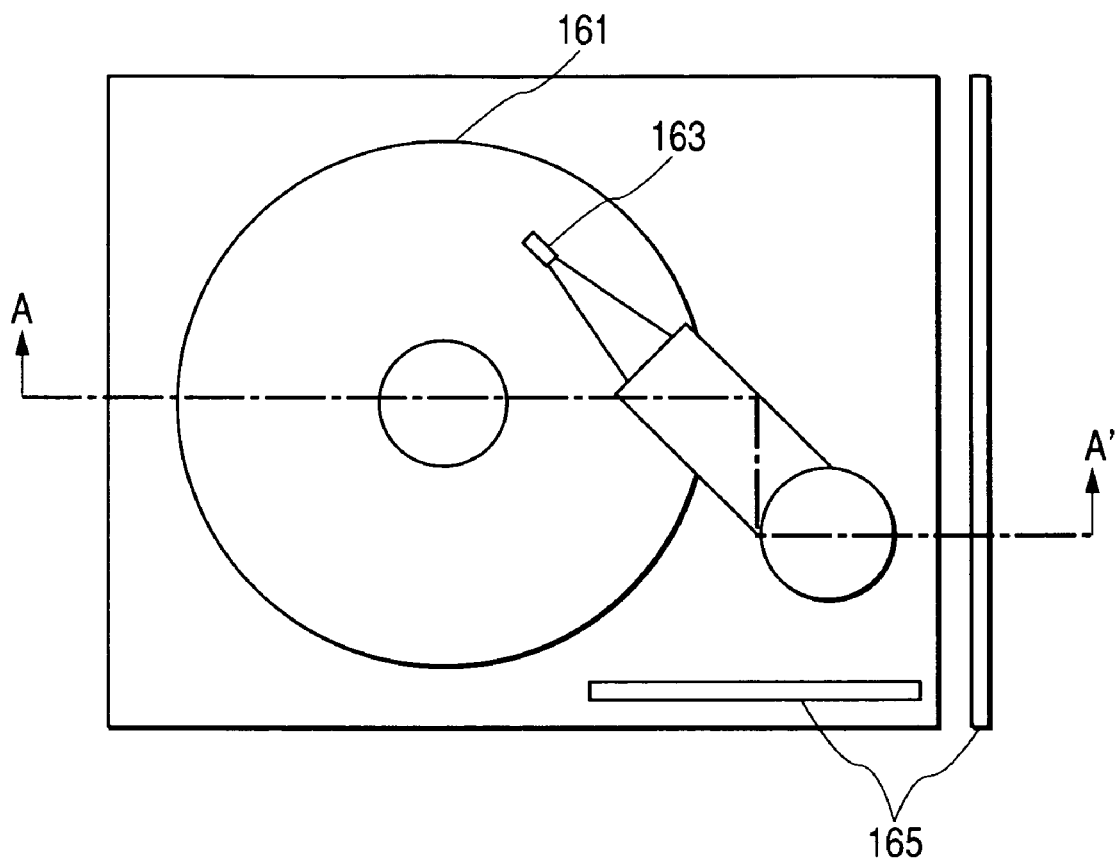
FIG. 16A is a plan view schematically showing a magnetic storage apparatus according to the fourth embodiment of the present invention.
Figure 16B:
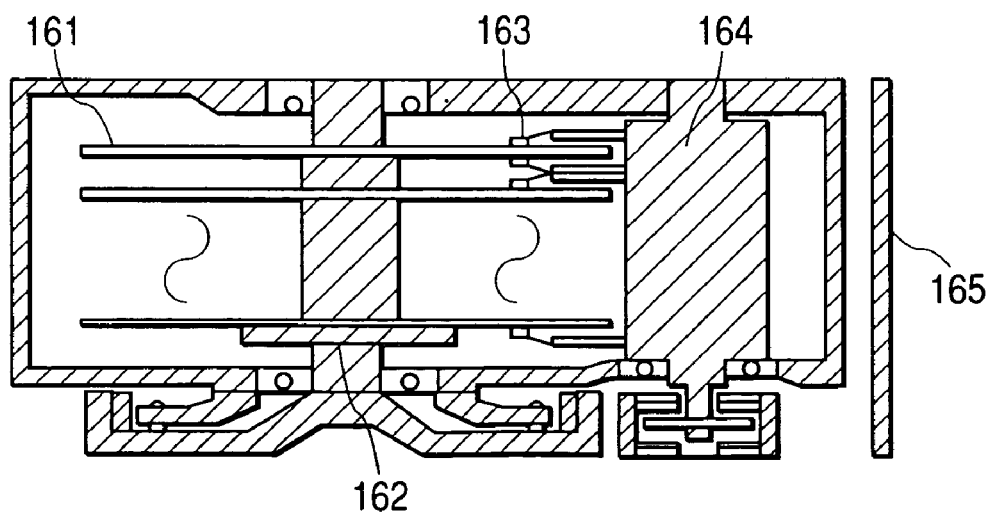
FIG. 16B is a longitudinal cross-sectional view of FIG. 16A by an A–A' line according to the fourth embodiment of the present invention.

Next, a description is given of the structure of a magnetic storage apparatus according to the fourth embodiment with reference to FIGS. 16A and 16B. Referring to FIGS. 16A and 16B, the magnetic storage apparatus has a general structure including a perpendicular magnetic recording medium 161, a driving section 162 for driving the perpendicular magnetic recording medium 161, magnetic head 163, driving means 164, and a recording/reproducing processing unit 165 of the magnetic head. The magnetic head used here is a read/write separating type magnetic head which is formed on a magnetic head slider. The single-pole-type

TABLE 7

| MEDIUM | LAYER STRUCTURE OF SOFT MAGNETIC UNDERLAYER (Numbers in parentheses indicate the thickness of each layer.) unit: nm | He1' (kA/m) | He1" (kA/m) | He2 (kA/m) | SPIKE NOISE | MODULATION |
|---|---|---|---|---|---|---|
| O | NiFe(5)/FeMn(10)/CoTaZr(50)/Ru(0.8)/CoTaZr(100)/ Ru(0.8)/CoTaZr(60) | 6.99 | 4.98 | 4.99 | NONE | NONE |
| P | NIFe(5)/FeMn(10)/FeCoB(50)/Cr(0.8)/FeCoB(100)/ Cr(0.8)/FeCoB(50) | 5.83 | 5.21 | 5.21 | NONE | NONE |

Figure 13:
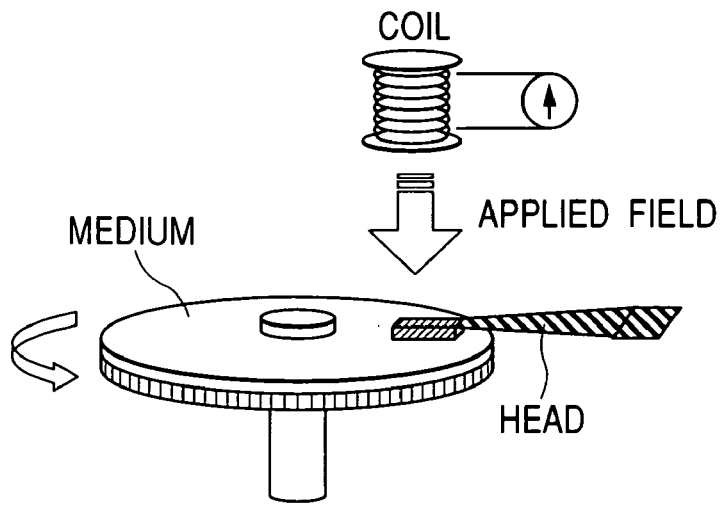
FIG. 13 is a schematic diagram of an estimation method of the stray-field robustness according to the third embodiment of the present invention.
Figure 14:
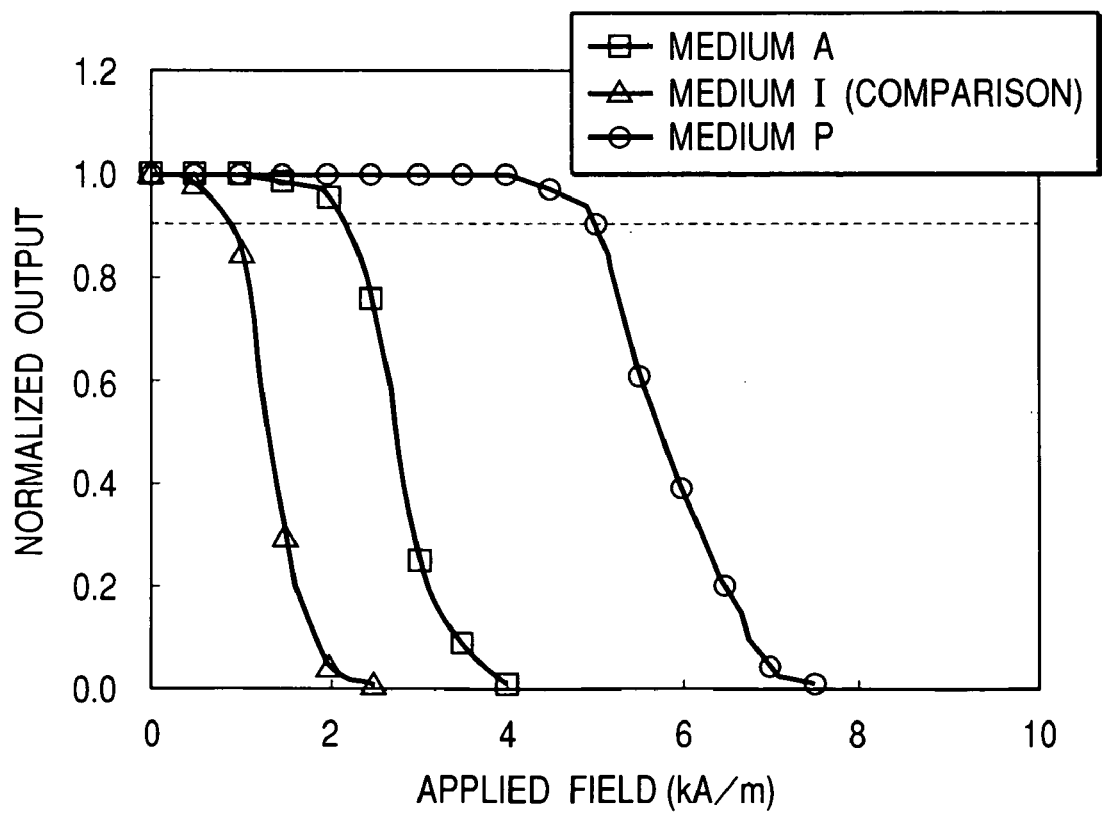
FIG. 14 is a diagram showing a relationship between an external magnetic field and an reproduced output according to the third embodiment of the present invention.

Next, the stray-field robustness is estimated by using the medium A according to the first embodiment and the medium I according to the comparison and a medium P according to the third embodiment. Referring to FIG. 13, a coil is arranged to the top of the medium, the magnetic field is applied to the medium by flowing current to the coil, and it is checked how the output signal changes depending on the magnetic field. FIG. 14 shows the evaluation result. The external magnetic field at which the output is reduced by recording head has the track width of 0.22 μm, the GMR head for writing with the shield gap of 0.08 μm and with the track width of 0.2 μm. The medium A according to the first embodiment is incorporated and the read/write characteristics are evaluated under the condition that the head flying height is 10 nm. In this case, the specification satisfies the read/write characteristics of the a real recording density of 7.75 Gbit per square centimeter within the temperature range of 10° C. to 50° C.

(Fifth Embodiment)

Figure 17:
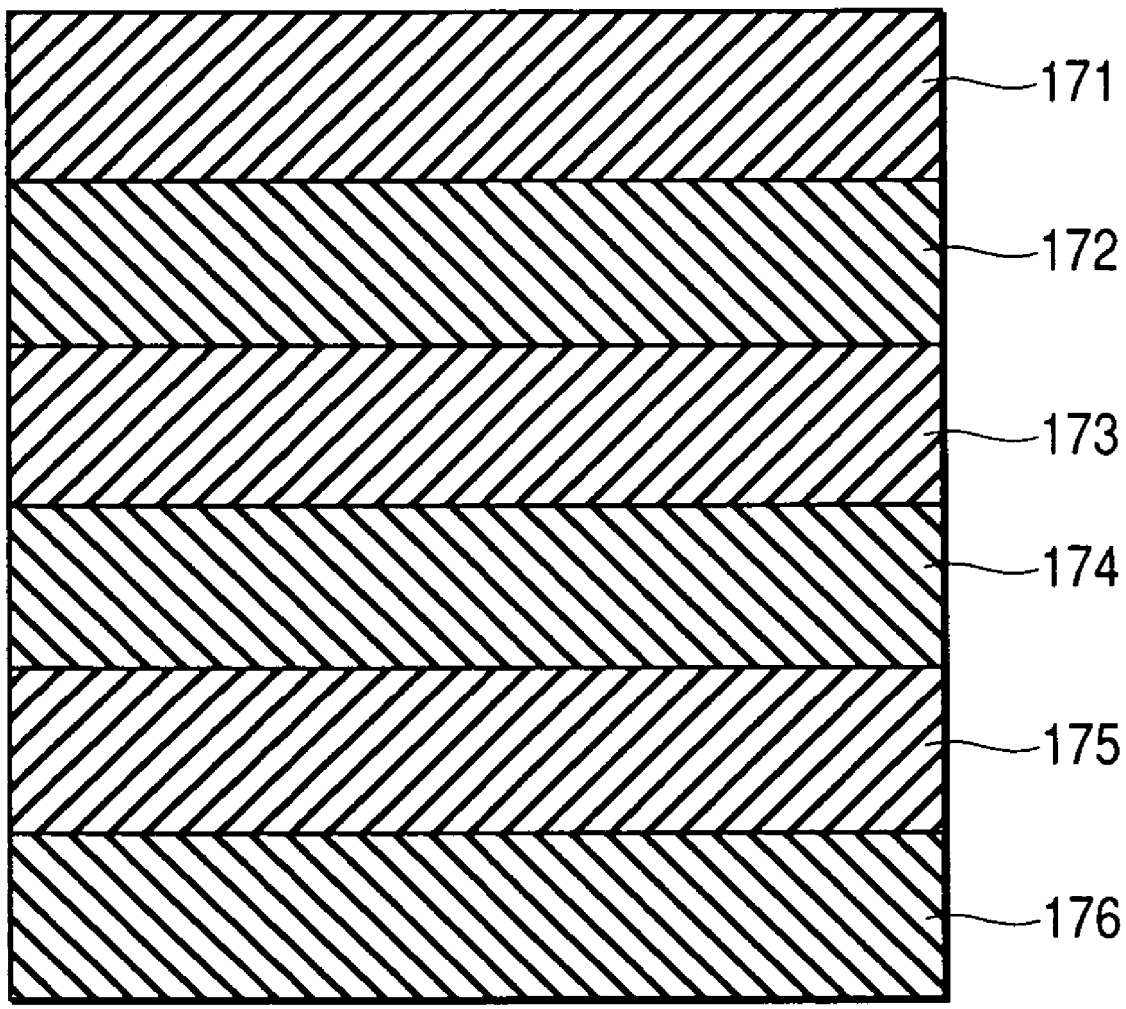
FIG. 17 is a diagram showing the layer structure of a high-sensitive element using a tunneling magnetoresistive effect according to the fifth embodiment of the present invention.

According to the fifth embodiment, a magnetic storage apparatus has the same structure as that according to the fourth embodiment with the tunneling magnetoresistive effect for the write head. The magnetic storage apparatus has the medium A according to the first embodiment and the read/write characteristics are evaluated under the condition that the head flying height is 8 nm. In this case, the specification satisfies the read/write characteristics of the a real recording density of 8.14 Gbit per square centimeter within the temperature range of 10° C. to 50° C. Referring to FIG. 17, a high-sensitive element using the tunneling magnetoresistive effect for the evaluation has a well-known structure including an upper electrode, an antiferromagnetic layer, a pinned layer, an insulting layer, a free layer, and a lower electrode.

(Sixth Embodiment)

Figure 18:
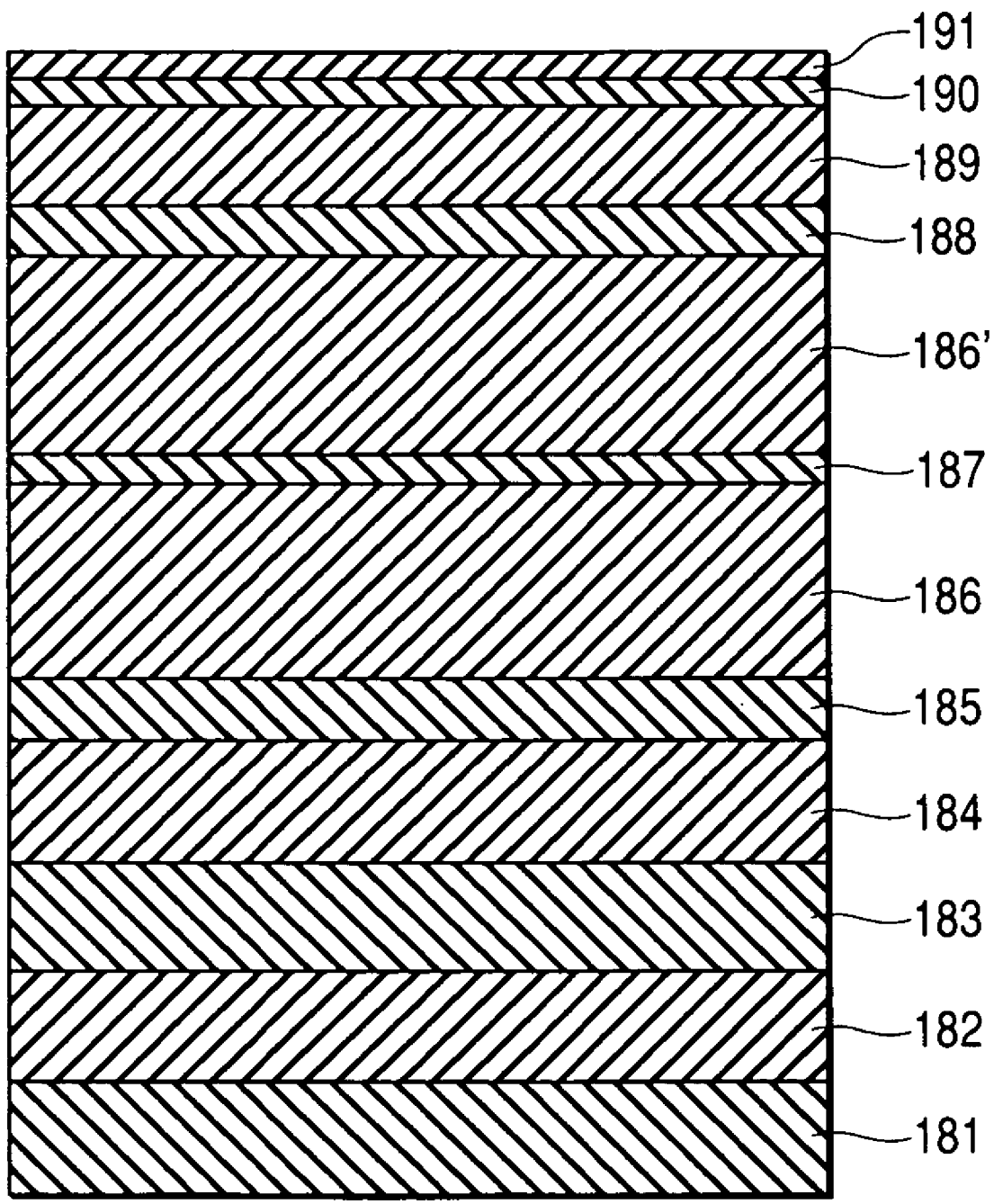
FIG. 18 is a diagram showing the layer construction of a perpendicular magnetic recording medium according to the sixth embodiment of the present invention.

FIG. 18 shows the layer structure of a perpendicular magnetic recording medium according to the sixth embodiment. Referring to FIG. 18, A 2.5-type glass disk is employed as a substrate 181. Sequentially formed on the substrate 181 are a pre-coating layer 182, an fcc soft metal layer 183, an antiferromagnetic layer 184, a ferromagnetic layer 185, a first amorphous soft magnetic layer 186, a non-magnetic layer 187, and a second amorphous soft magnetic layer 186', by DC magnetron sputtering. Then, the substrate 181 is cooled approximately to 60° C. by using a cooling unit with a magnetic field. The substrate temperature just before entering the cooling unit with a magnetic filed is approximately 100° C. It is because the substrate is exposed in plasma. The cooling unit with a magnetic field comprises two opposed copper cooling plates and a coil for applying the magnetic field to the disk substrate. According to the sixth embodiment, the cooling plate are cooled approximately to −100° C. and then is cooled in a magnetic field for five seconds in the hydrogen or helium atmosphere of approximately 200 Pa. The magnetic field upon cooling is applied in the radial direction of the disk substrate, and the polarity of the magnetic field is the same as the polarity of leakage field from a DC magnetron sputtering cathode. The magnetic field is set within the range of 8 kA/m to 10 kA/m on the disk substrate. After that, an intermediate layer 188, a perpendicular recording layer 189, and a protective layer 190 are sequentially formed. Table 8 shows the target composition, the Ar gas pressure, and the thickness which are used for the manufacture of layers. A lubricant layer 191 is formed by coating the perfluoroalkylpolyether material diluted with the fluorocarbon material.

Figure 19A:
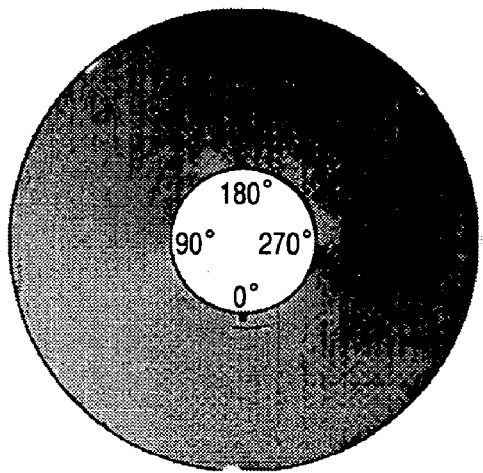
FIG. 19 is a diagram showing the magnetic domain structure of the second amorphous soft magnetic layer according to the sixth embodiment of the present invention.
Figure 19B:
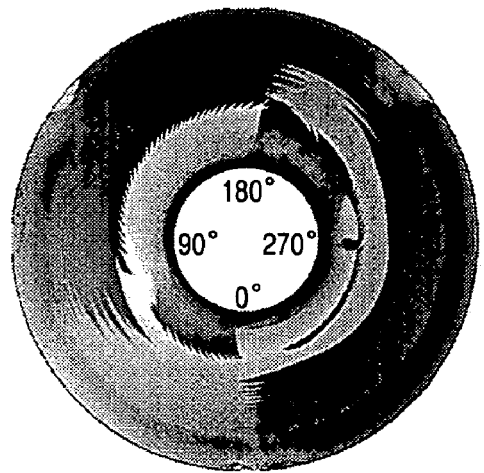

188 and the perpendicular recording layer 189 is used. For the purpose of comparison, FIG. 19 shows a result of observing a sample produced by setting the polarity of magnetic field of the cooling unit to the polarity inverse to that of the leakage field from the cathode. According to the sixth embodiment, the contrast of the magnetic domain image of the second amorphous soft magnetic layer is uniform and, obviously, a quasi-single domain structure is realized. On the other hand, in the comparison, the magnetic domain image of the second amorphous soft magnetic layer has different contrasts and, obviously, a multi-magnetic domain structure is realized. That is, in the case of using the antiferromagnetic layer consisting of FeMn alloy with relatively low blocking temperature, the polarity of the leakage field from the cathode is set to be the same as the polarity of magnetic field in the cooling unit. Thus, the first amorphous soft magnetic layer has a quasi-single domain structure in which the magnetization is aligned in the direction of the magnetic field. When the magnetic field is removed, the exchange bias field is applied to the first amorphous soft magnetic layer from the antiferromagnetic layer via the ferromagnetic layer. Therefore, the state of the quasi-single domain is held. Further, since the second amorphous soft magnetic layer is antiferromagnetically coupled to the first amorphous soft magnetic layer via the non-magnetic layer, the domain structure of the second amorphous soft magnetic layer becomes a quasi-single domain. According to the sixth embodiment, the leakage field from the sputtering cathode is used as means for applying the magnetic field in the radial direction of the disk substrate upon forming the film. However, a similar magnetic field may be applied by using another coil. Further, according to the sixth embodiment, the ferromagnetic layer 185 is inserted between the antiferromagnetic layer 184 and the first amorphous soft magnetic layer 186. However, when the thickness of the first amorphous soft magnetic layer is thin and a sufficient exchange bias field is obtained, the ferromagnetic layer 185 can be omitted.

According to the sixth embodiment, advantageously, the manufacturing process of the perpendicular magnetic recording medium does not need the heat treatment using a heater so as to control the magnetic domain of the soft magnetic underlayer, and the time for cooling in the magnetic field is short. In particular, according to the sixth embodiment, the manufacturing costs of the perpendicular magnetic recording medium are reduced by combining the intermediate layer and the perpendicular recording layer which does not need the heat treatment of the substrate.

TABLE 8

|  | Target composition | P Ar (Pa) | Thickness (nm) |
| --- | --- | --- | --- |
| Pre-coating layer | 52.5at % Ni-37.5at % Ta-10at % Zr | 1 | 30 |
| fcc soft magnetic layer | 81at % Ni-19at % Fe | 0.5 | 5 |
| Antiferromagnetic layer | 50at % Fe-50at % Mn | 1 | 10 |
| 1st soft magnetic layer | 92at % Co-3at % Ta-5at % Zr | 0.5 | 50 |
| Non-magnetic layer | Ru | 0.5 | 0.8 |
| 2nd soft magnetic layer | 92at % Co-3at % Ta-5at % Zr | 0.5 | 100 |
| Intermediate layer | Ru | 2.5 | 20 |
| Perpendicular rec. layer | (73at % Co-17at % Cr-14at % Pt) + SiO2 | 4 | 18 |
| Protective layer | Carbon | 1 | 5 |

FIG. 19 shows a result of observing, by an optical surface analyzer, the structure of magnetic domain of the second amorphous soft magnetic layer according to the sixth embodiment. A sample not having the intermediate layer According to the present invention, it is possible to realize a magnetic storage apparatus with a recording density of 7.75 Gbit per square centimeter, with a low error rate, and with high reliability.

What is claimed is:

1. A perpendicular magnetic recording medium having a perpendicular recording layer on a substrate via a soft magnetic underlayer, wherein said soft magnetic underlayer comprises:
   a ferromagnetic layer which is a body-centered cubic alloy mainly composed of Co and Fe,
   a first amorphous soft magnetic layer formed directly on the ferromagnetic layer;
   a second amorphous soft magnetic layer;
   a non-magnetic layer which is formed between said first amorphous soft magnetic layer and said second amorphous soft magnetic layer; and
   an antiferromagnetic layer formed under the ferromagnetic layer, which applies an exchange bias field to said first amorphous soft magnetic layer, and
   said first amorphous soft magnetic layer and said second amorphous soft magnetic layer are antiferromagnetically coupled.

2. A perpendicular magnetic recording medium according to claim 1, further comprising:
   a first ferromagnetic layer, between said first amorphous soft magnetic layer and said non-magnetic layer; and
   a second ferromagnetic layer, between said second amorphous soft magnetic layer and said non-magnetic layer.

3. A perpendicular magnetic recording medium according to claim 1, wherein the thickness of said first amorphous soft magnetic layer is equal to the thickness of said second amorphous soft magnetic layer.

4. A perpendicular magnetic recording medium having a perpendicular recording layer on a substrate via a soft magnetic underlayer, wherein said soft magnetic underlayer comprises:
   a ferromagnetic layer which is a body-centered cubic alloy mainly composed of Co and Fe;
   a first amorphous soft magnetic layer formed directly on the ferromagnetic layer;
   a second amorphous soft magnetic layer;
   a first non-magnetic layer which is formed between said first amorphous soft magnetic layer and said second amorphous soft magnetic layer;
   a third amorphous soft magnetic layer;
   a second non-magnetic layer which is formed between said second amorphous soft magnetic layer and said third amorphous soft magnetic layer; and
   an antiferromagnetic layer formed under the ferromagnetic layer, which applies an exchange bias field to said first amorphous soft magnetic layer,
   said first amorphous soft magnetic layer and said second amorphous soft magnetic layer are antiferromagnetically coupled, and
   said second amorphous soft magnetic layer and said third amorphous soft magnetic layer are antiferromagnetically coupled.

5. A perpendicular magnetic recording medium according to claim 4, wherein the thickness of said second amorphous soft magnetic layer is equal to the sum of the thickness of said first amorphous soft magnetic layer and the thickness of said third amorphous soft magnetic layer.

6. A perpendicular magnetic recording medium according to claim 1, wherein a magnetization curve of said soft magnetic underlayer measured by applying a magnetic field to said disk substrate in a radial direction is step-shaped with a magnetization level which is stable in an arbitrary magnetic field range including a zero magnetic field, and
   an absolute of a center value of a switching field from saturation magnetization on a negative magnetic field side to said magnetization level is different from an absolute of a center value of a switching field from the saturation magnetization on a positive magnetic field side to the magnetization level.

7. A magnetic storage apparatus comprising:
   a perpendicular magnetic recording medium having a perpendicular recording layer on a substrate via a soft magnetic underlayer;
   a driving section which drives said perpendicular magnetic recording medium in a recording direction;
   a magnetic head having a recording section and a reproducing section;
   a unit which relatively moves said magnetic head to said perpendicular magnetic recording medium; and
   a recording/reproducing processing unit which inputs a signal from said magnetic head and reproduces an output signal from said magnetic head,
   wherein said soft magnetic underlayer of said perpendicular magnetic recording medium comprises:
   a ferromagnetic layer which is a body-centered cubic alloy mainly composed of Co and Fe;
   a first amorphous soft magnetic layer formed directly on the ferromagnetic layer;
   a second amorphous soft magnetic layer;
   a non-magnetic layer which is formed between said first amorphous soft magnetic layer and said second amorphous soft magnetic layer; and
   an antiferromagnetic layer formed under the ferromagnetic layer, which applies an exchange bias field to said first amorphous soft magnetic layer,
   said first amorphous soft magnetic layer and said second amorphous soft magnetic layer are antiferromagnetically coupled,
   said recording section of said magnetic head comprises a single-pole head, and
   said reproducing section of said magnetic head comprises a high-sensitive element using a magnetoresistive effect or tunneling magnetoresistive effect.

8. A magnetic storage apparatus comprising:
   a perpendicular magnetic recording medium having a perpendicular recording layer on a substrate via a soft magnetic underlayer;
   a driving section which drives said perpendicular magnetic recording medium in a recording direction;
   a magnetic head having a recording section and a reproducing section;
   a unit which relatively moves said magnetic head to said perpendicular magnetic recording medium; and
   a recording/reproducing processing unit which inputs a signal from said magnetic head and reproduces an output signal from said magnetic head,
   wherein said soft magnetic underlayer of said perpendicular magnetic recording medium comprises:
   a ferromagnetic layer which is a body-centered cubic alloy mainly composed of Co and Fe;
   a first amorphous soft magnetic layer formed directly on the ferromagnetic layer;
   a second amorphous soft magnetic layer;
   a (first) non-magnetic layer which is formed between said first amorphous soft magnetic layer and said second amorphous soft magnetic layer;
   a third amorphous soft magnetic layer;
   a (second) non-magnetic layer which is formed between said second amorphous soft magnetic layer and said third amorphous soft magnetic layer; and an antiferromagnetic layer formed under the ferromagnetic layer, which applies an exchange bias magnetic field to said first amorphous soft magnetic layer, said first amorphous soft magnetic layer and said second amorphous soft magnetic layer are antiferromagnetically coupled, said second amorphous soft magnetic layer and said third amorphous soft magnetic layer are antiferromagnetically coupled, said recording section of said magnetic head comprises a single-pole head, and said reproducing section of said magnetic head comprises a high-sensitive element using a magnetoresistive effect or tunneling magnetoresistive effect.

9. A perpendicular magnetic recording medium having a perpendicular recording layer on a disk substrate via a soft magnetic underlayer, wherein said soft magnetic underlayer comprises:

a ferromagnetic layer which is a body-centered cubic alloy mainly composed of Co and Fe;

a first amorphous soft magnetic layer formed directly on the ferromagnetic layer;

a second amorphous soft magnetic layer;

a non-magnetic layer which is formed between said first amorphous soft magnetic layer and said second amorphous soft magnetic layer; and an antiferromagnetic layer formed under the ferromagnetic layer, which applies an exchange bias field to said first amorphous soft magnetic layer, said antiferromagnetic layer contains a disordered alloy mainly composed of Fe and Mn, the direction of said exchange bias field is substantially in parallel with said radial direction of said disk substrate, and said first amorphous soft magnetic layer and said second amorphous soft magnetic layer are antiferromagnetically coupled.

10. A perpendicular magnetic recording medium according to claim 9, wherein said antiferromagnetic layer is formed on a metal layer or alloy having a face-centered cubic structure containing Pd, Pt, Cu or NiFe.

* * * * *

UNITED STATES PATENT AND TRADEMARK OFFICE
CERTIFICATE OF CORRECTION

PATENT NO.         : 7,153,596 B2                                              Page 1 of 1
APPLICATION NO. : 10/697002
DATED              : December 26, 2006
INVENTOR(S)        : K. Tanahashi et al.

It is certified that error appears in the above-identified patent and that said Letters Patent is hereby corrected as shown below:

ON THE TITLE PAGE

Please correct (73) Assignee to read as follows:

(73)  ~~Hitachi, Ltd., Tokyo (JP)~~
<u>Hitachi Global Storage Technologies Japan, Ltd., Odaware-Shi (JP)</u>

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,153,596 B2 Page 1 of 1
APPLICATION NO. : 10/697002
DATED : December 26, 2006
INVENTOR(S) : K. Tanahashi et al.

It is certified that error appears in the above-identified patent and that said Letters Patent is hereby corrected as shown below:

ON THE TITLE PAGE

Please correct (73) Assignee to read as follows:

(73) ~~Hitachi, Ltd., Tokyo (JP)~~
<u>Hitachi Global Storage Technologies Japan, Ltd., Odaware-Shi (JP)</u>

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,153,596 B2  
APPLICATION NO. : 10/697002  
DATED : December 26, 2006  
INVENTOR(S) : K. Tanahashi et al.

It is certified that error appears in the above-identified patent and that said Letters Patent is hereby corrected as shown below:

ON THE TITLE PAGE

Please correct (73) Assignee to read as follows:

(73) Hitachi Global Storage Technologies Japan, Ltd., ~~Odaware~~ Odawara-Shi (JP)

Signed and Sealed this

First Day of September, 2009

David J. Kappos
*Director of the United States Patent and Trademark Office*